US012780206B2

(12) United States Patent
Stein et al.

(10) Patent No.: US 12,780,206 B2
(45) Date of Patent: Nov. 3, 2026

(54) METHOD AND DEVICE FOR THE AUTOMATED DRIVING MODE OF A VEHICLE, AND VEHICLE

(71) Applicant: Daimler Truck AG, Leinfelden-Echterdingen (DE)

(72) Inventors: Fridtjof Stein, Ostfildern (DE); Sebastian Kleinschmidt, Hannover (DE); Stefan Heyer, Esslingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 201 days.

(21) Appl. No.: 17/926,980

(22) PCT Filed: Apr. 1, 2021

(86) PCT No.: PCT/EP2021/058729

§ 371 (c)(1),
(2) Date: Nov. 21, 2022

(87) PCT Pub. No.: WO2021/233602

PCT Pub. Date: Nov. 25, 2021

(65) Prior Publication Data

US 2023/0242119 A1 Aug. 3, 2023

(30) Foreign Application Priority Data

May 22, 2020 (DE) ..................... 10 2020 003 073.4

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2520/10* (2013.01); *B60W 2552/10* (2020.02); *B60W 2554/406* (2020.02); *B60W 2720/10* (2013.01)

(58) Field of Classification Search
CPC .............................................. B60W 30/18163
See application file for complete search history.

(56) References Cited

U.S. PATENT DOCUMENTS 9,760,092 B2 * 9/2017 Ferguson ............. G05D 1/2437
9,922,553 B2 * 3/2018 McErlean .............. B60K 35/10
11,358,606 B2 6/2022 Merfels et al.
11,731,657 B2 * 8/2023 Hammoud ............ B60R 25/102 701/24

(Continued)

FOREIGN PATENT DOCUMENTS

CN 108116410 A 6/2018
CN 109466551 A 3/2019

(Continued)

OTHER PUBLICATIONS

Google Patents for WO2019245982A1 (Year: 2019).*

(Continued)

*Primary Examiner* — Jean Paul Cass
(74) *Attorney, Agent, or Firm* — Crowell & Moring LLP

(57) ABSTRACT

A method for autonomously driving a vehicle. When a bend is detected ahead of the vehicle, it is determined whether the visibility of a detection unit is below a threshold value. If so, the vehicle is automatically maneuvered to change lanes to an outside lane of the bend.

9 Claims, 7 Drawing Sheets

(56) References Cited

U.S. PATENT DOCUMENTS

| | | | | |
|---|---|---|---|---|
| 11,740,633 | B2 * | 8/2023 | Gier | G05D 1/0088 701/23 |
| 11,782,449 | B2 * | 10/2023 | Taira | G05D 1/0214 701/26 |
| 11,794,762 | B2 * | 10/2023 | McGill | B60W 50/14 |
| 11,821,738 | B2 * | 11/2023 | Rizk | B60W 60/001 |
| 11,853,035 | B2 * | 12/2023 | Corrodi | G05B 19/4155 |
| 11,884,293 | B2 * | 1/2024 | Srinivasan | B60W 50/029 |
| 11,908,318 | B2 * | 2/2024 | Morris | G05D 1/0088 |
| 12,014,630 | B2 * | 6/2024 | Uçar | G08G 1/012 |
| 2010/0214085 | A1 * | 8/2010 | Avery | G08G 1/161 340/435 |
| 2016/0280224 | A1 * | 9/2016 | Tatourian | B60W 40/076 |
| 2017/0297576 | A1 * | 10/2017 | Halder | B60W 30/182 |
| 2018/0148053 | A1 | 5/2018 | Lee et al. | |
| 2018/0345978 | A1 * | 12/2018 | Fujii | B60W 30/18163 |
| 2019/0019416 | A1 * | 1/2019 | Perko | B60W 60/0016 |
| 2020/0258391 | A1 * | 8/2020 | Raichelgauz | G06N 3/045 |
| 2022/0250614 | A1 * | 8/2022 | Ota | B60W 30/09 |
| 2023/0012853 | A1 * | 1/2023 | Tam | B60W 30/09 |
| 2024/0025412 | A1 * | 1/2024 | Zhang | B60W 40/02 |

FOREIGN PATENT DOCUMENTS

| | | | | |
|---|---|---|---|---|
| CN | 110979330 | A | 4/2020 | |
| DE | 10 2014 014 120 | A1 | 4/2015 | |
| DE | 10 2016 219 762 | A1 | 4/2018 | |
| DE | 10 2018 003 784 | A1 | 11/2018 | |
| DE | 10 2018 103 698 | A1 | 8/2019 | |
| DE | 10 2018 111 070 | A1 | 11/2019 | |
| EP | 3 653 460 | A1 | 5/2020 | |
| WO | WO-2019245982 | A1 * | 12/2019 | G06V 20/58 |

OTHER PUBLICATIONS

PCT/EP2021/058729, International Search Report dated Jul. 1, 2021 (Two (2) pages).

Chinese-language Office Action issued in Chinese Application No. 202180037233.7 dated Jun. 9, 2025 with partial English translation (12 pages).

* cited by examiner

METHOD AND DEVICE FOR THE AUTOMATED DRIVING MODE OF A VEHICLE, AND VEHICLE

BACKGROUND AND SUMMARY OF THE INVENTION

The invention relates to the automated driving mode of a vehicle. The invention further relates to a device for the automated driving mode of a vehicle and to a vehicle having such a device.

A method for autonomously operating a vehicle on a section of road lying ahead is known from DE 10 2014 014 120 A1. Here, the autonomous driving mode of the vehicle is only permitted if one or a group of the following conditions is or are met for a predefined distance of the section of road lying ahead: there is a physical barrier on at least one side of a current carriageway of the vehicle; a lane of the vehicle has a minimum lane width; there are no crests and dips which substantially restrict the range of surroundings detection sensors; the number of lanes does not change; there are no tunnels; there are no buildings on the carriageway; there is no motorway junction; a radius of curvature of the lane of the vehicle is greater than a predefined limit value; there is no traffic disruption; there are no traffic reports about hazardous situations; and there are no traffic reports about the presence of roadworks.

In addition, DE 10 2014 014 139 A1 describes a method for operating a distance and speed control function of a vehicle, in particular of an autonomously driving vehicle or a vehicle driving in a highly automated manner. The method provides that at least one measure that increases driving safety is initiated if the driver is not paying attention and if at least one of the following conditions is met: the vehicle is approaching or is at a critical point with regard to the routing; the vehicle is approaching or is at a point with traffic disruption; the vehicle is approaching or is at a point with impaired visibility; the vehicle is accelerated by the distance and speed control function; there is an anomaly in the flow of traffic in the vicinity of the vehicle.

The instant disclosure is directed to a method and a device for the automated driving mode of a vehicle, as well as a vehicle having such a device.

In particular, a method for the automated driving mode of a vehicle provides that, in the case of a bend lying ahead of the vehicle, a visibility restriction, expected on the basis of the bend, of at least one detection unit of a surroundings sensor system directed in the direction of travel of the vehicle is determined, and then, if it is determined that a visibility of the at least one detection unit falls below a predefined threshold value, a lane change of the vehicle to an outside lane of the bend is automatically performed, provided that there is an outside lane of the bend, wherein preferably there is no legal requirement to drive on the right.

By applying the method, in particular by changing to the outside lane, it is possible to increase the visibility of the at least one detection unit in the region of the bend so that the vehicle can take the bend with a higher current driving speed. In this case, the current driving speed is adapted as a function of the visibility of the at least one detection unit so that the vehicle can initiate emergency braking if there is an object in its lane that cannot be driven over, whereby the risk of the vehicle colliding with the object is considerably reduced.

By means of the method, a lane is chosen in such a way that an optimised visibility of the at least one detection unit in the bend is achieved and therefore a comparatively safe automated driving mode of the vehicle can be realised at the maximum possible current driving speed.

Provision is made in one possible development of the method for the threshold value to vary as a function of a current driving speed of the vehicle. In particular, the higher the current driving speed, the lower the threshold value. The lane change is triggered if the visibility of the at least one detection unit falls below the threshold value. The visibility is increased by the lane change to the outside lane of the bend so that the visibility in the automated driving mode of the vehicle can be increased and by braking and/or performing an evasive manoeuvre, the vehicle is able to avoid colliding with an object that cannot be driven over, with attention being paid to road users in the vicinity of the vehicle.

In one possible development of the method it is determined whether an outside lane of the bend on a route section of the vehicle is present on the basis of map data and/or at least on the basis of detected signals from a camera of the vehicle. Such a lane change is only initiated when there is information about the presence of an outside lane of the bend, as a result of which traffic safety can be increased.

In addition, provision is made in one possible development of the method for the lane change to be performed as a function of a traffic density detected ahead of the vehicle. The method for optimising the visibility of the at least one detection unit is then carried out in particular if, by and large, the vehicle is travelling alone on the route section or if there is a sufficiently large distance from following vehicles so that the vehicle returns to its original lane after taking the bend.

Provision is made in one possible development of the method for a current driving speed of the vehicle to be adapted to a bend-induced and/or crest-induced and/or dip-induced reduction in the visibility of the at least one detection unit. A bend-induced, crest-induced or dip-induced reduction in the visibility is to be understood in this case as a visibility reduction that is caused by a respective bend, crest or dip ahead of the vehicle.

The current driving speed of the vehicle is reduced to increase safety, for example during operation of the vehicle, if the visibility of the at least one detection unit is comparatively low, with a further threshold value in relation to the visibility being able to be predefined for this purpose.

Moreover, in one possible development of the method, a required visibility of the at least one detection unit is determined on the basis of a predicted current braking distance of the vehicle, wherein the braking distance is dependent on the maximum inherent deceleration and inherent speed of the vehicle, i.e. the current driving speed. In particular, the higher the current driving speed, the greater the required visibility range of the at least one detection unit, since the braking distance increases when the driving speed increases. It is therefore ensured as far as possible that when an object that cannot be driven over is detected in its lane, the vehicle is capable of initiating a braking action, so that a collision with the object can be ruled out as far as possible.

The outside lane of the bend is advantageously a lane for the direction of travel of the vehicle. The lane change is thus restricted to lanes in the direction of travel of the vehicle, i.e. the vehicle does not change into a lane of oncoming traffic. The method is thus advantageously applicable to a multi-lane road which has several lanes extending in the direction of travel of the vehicle.

The outside lane of the bend is advantageously a lane, in particular for the direction of travel of the vehicle, on an outer side of the vehicle with respect to the bend. The outside lane of the bend is thus a lane the position of which is defined relative to the lane of the vehicle. In particular, the outside lane of the bend is a lane which is on a left-hand side of the vehicle in the case of a right-hand bend ahead and is on right-hand side of the vehicle in the case of a left-hand bend ahead.

The instant disclosure further relates to a device for carrying out the method for the automated driving mode of the vehicle, wherein the device comprises a computing unit which is connected to the at least one detection unit of the surroundings sensor system of the vehicle. The computing unit is configured to determine a visibility restriction, expected on the basis of the bend, at least of the detection unit of the surroundings sensor system directed in the direction of travel of the vehicle, to compare the determined visibility with the predefined threshold value and in the event of the threshold value being undershot, to transmit appropriate information to a trajectory generator. The trajectory generator is configured to generate at least one trajectory for the lane change to the outside lane of the bend and to send the generated trajectory to an actuation system of the vehicle.

By means of the device, the vehicle is capable of changing to the outside lane of the bend in order to increase the visibility of the at least one detection unit so that an average speed of the vehicle can be optimised and the amount of fuel and/or electrical energy consumed can be reduced, i.e. also optimised, on the basis of an essentially steady driving mode.

Furthermore, the device can be a constituent part of a vehicle, which is configured as a self-driving truck or as a self-driving passenger car, wherein by means of the device and the method, as described above, the average speed of the vehicle and the amount of fuel and/or electrical energy consumed can be optimised.

DETAILED DESCRIPTION OF THE DRAWINGS

Exemplary embodiments of the invention will be explained in more detail in the following with reference to the drawings. Parts that correspond to each other are provided with the same reference signs throughout the FIGS.

Figure 1:
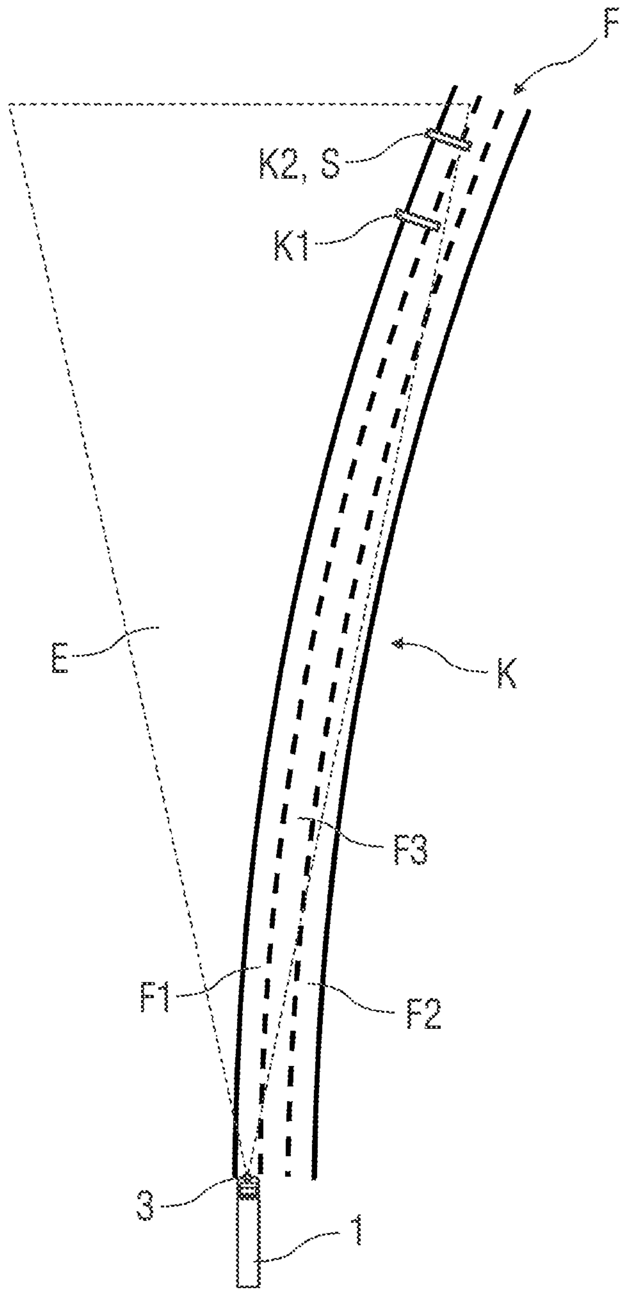
FIG. 1 schematically shows an exemplary situation in which there is a route section having three lanes and a vehicle driving in an outside lane of a bend.
Figure 2:
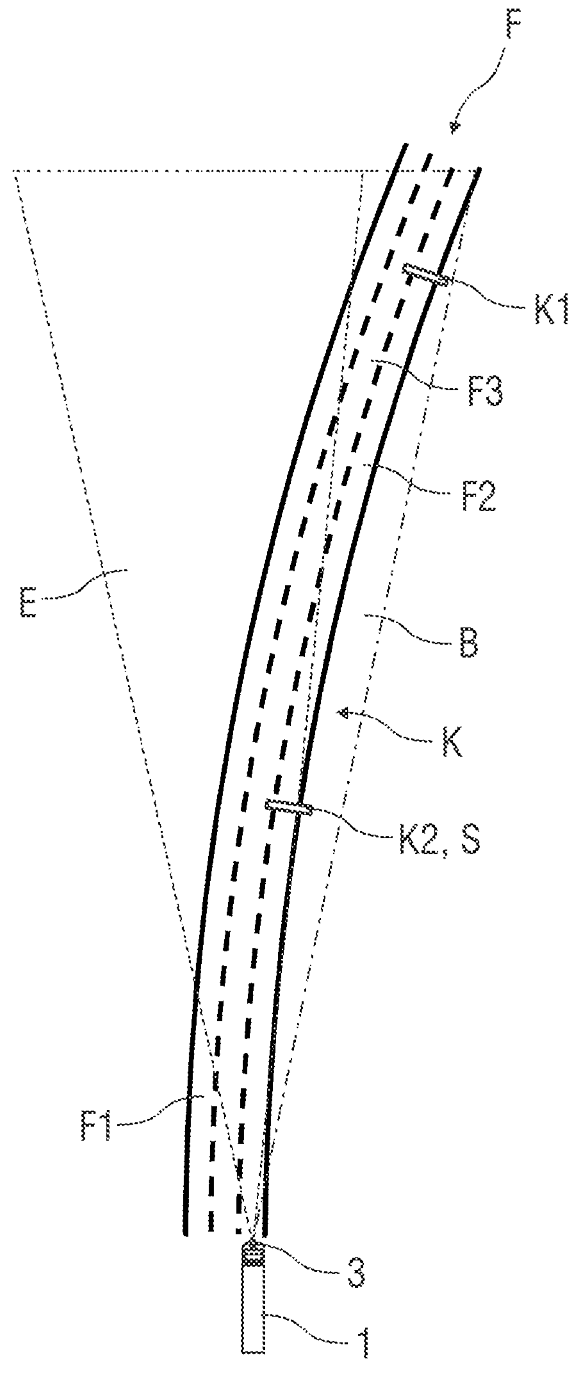
FIG. 2 schematically shows an exemplary situation in which there is a route section and a vehicle driving in an inner lane of a bend.

A route section F with three lanes F1 to F3 is shown in each of FIGS. 1 and 2, wherein the route section F is curved, i.e. has a bend K.

A vehicle 1, which is configured as a truck and is driving in automated mode, in particular without there being a vehicle user in the vehicle 1, is driving in an outside lane of the bend F1 in FIG. 1 and in an inside lane of the bend F2 in FIG. 2, wherein a central lane F3 runs between the outside lane of the bend F1 and the inside lane of the bend F2.

The route section F is in particular part of a motorway on which a large number of such self-driving vehicles 1 will be found in the future.

Figure 6:
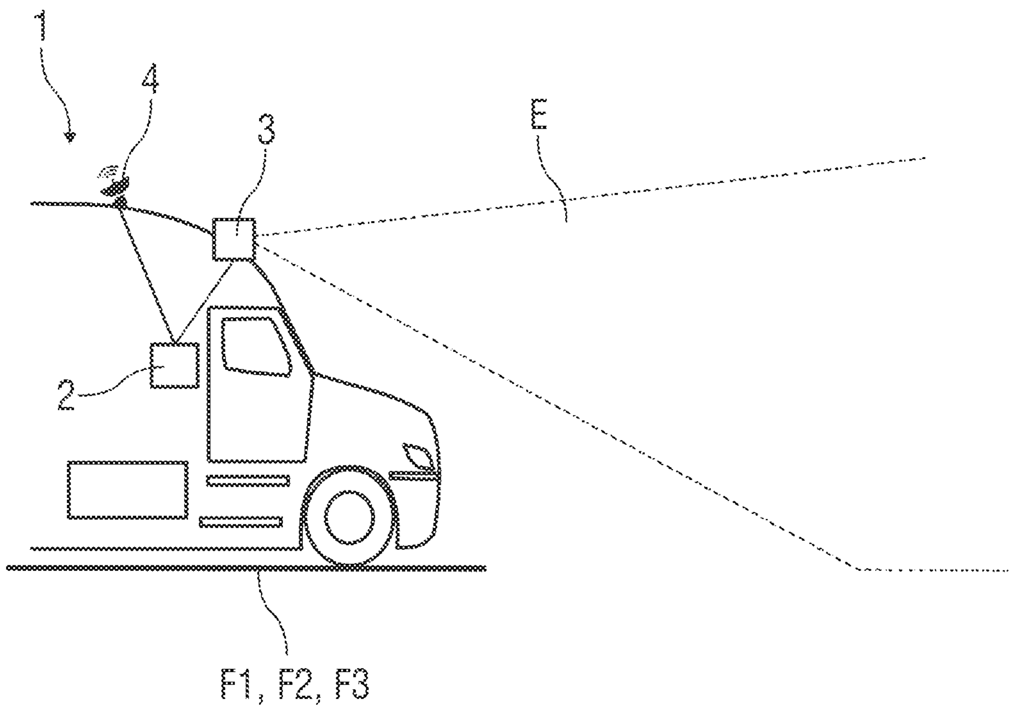
FIG. 6 schematically shows an exemplary vehicle with a detection unit, a position determining unit, and a computing unit.
Figure 7:
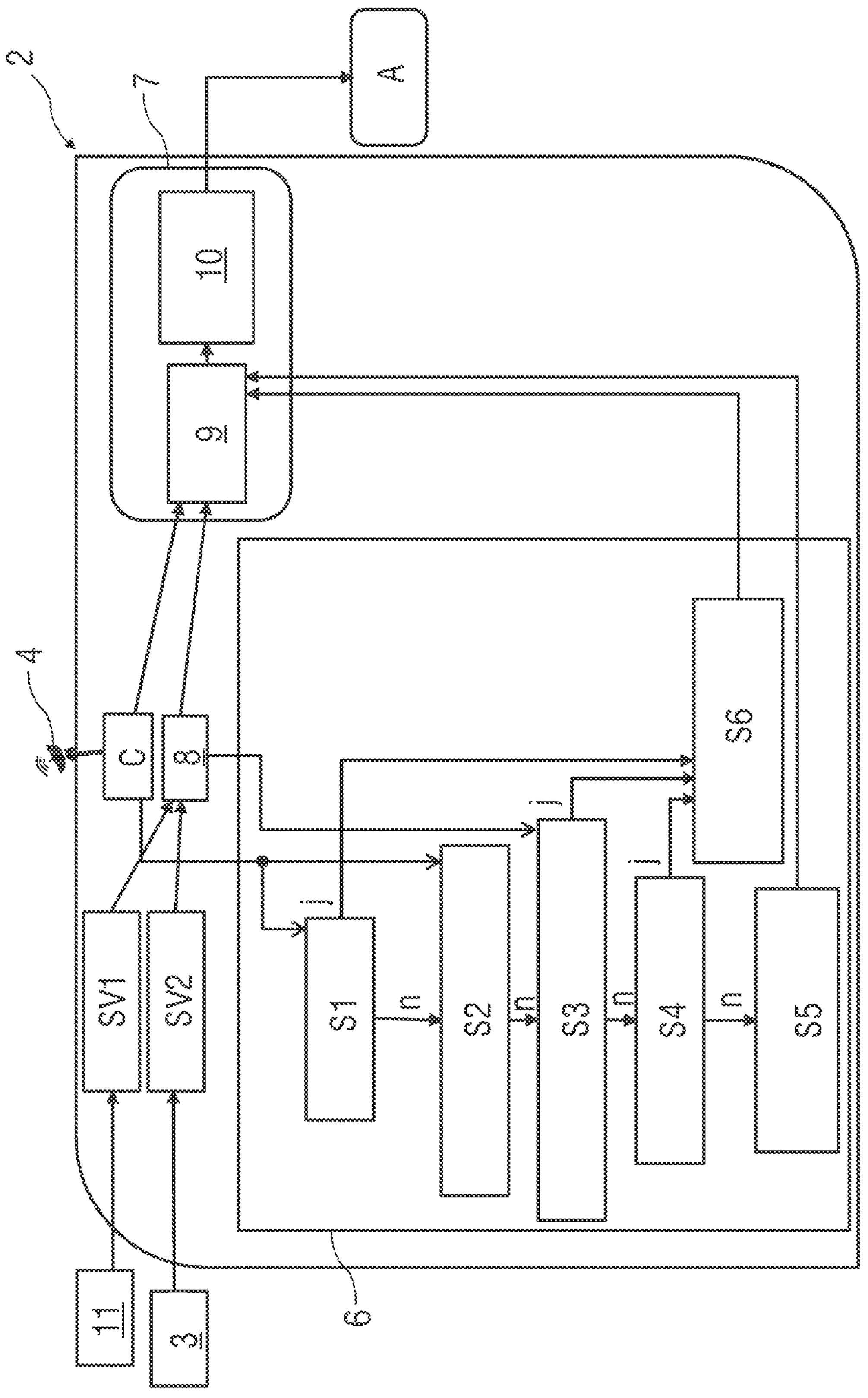
FIG. 7 schematically shows an exemplary computing unit with its modules.

The vehicle 1 comprises a computing unit 2, shown by way of example in FIGS. 6 and 7, which is connected to a number of detection units 3 of a surroundings sensor system of the vehicle 1, wherein the design of the detection units 3 is based on a radar, lidar and/or camera.

In addition, the vehicle 1 has a satellite-assisted position determining unit 4, which continuously receives a position signal which is used to determine a current position of the vehicle 1.

Such a self-driving vehicle 1 is located within an existing infrastructure using detected signals of the surroundings sensor system, the position signal and also map data of a digital map C stored in the vehicle, and the driving behaviour of the vehicle 1 is adjusted in relation to road users surveyed using detected signals of the surroundings sensor system.

The surroundings sensor system installed in the vehicle has surveying characteristics which are defined by a sensor type, a design and physical boundary conditions. Typically, the surroundings sensor system represents a compromise of various functional tasks. For example, a traffic-relevant region in front of the vehicle 1 is surveyed three-dimensionally by means of a lidar-based detection unit 3, whereby semantics of a scene detected in front of the vehicle 1 are determined using detected signals of a camera-based detection unit 3, whereby road signs and light signalling systems are detected.

Requirements derived therefrom determine parameters of the respective detection unit 3, such as a base width, a focal length, an aperture angle, a pixel density, a sensor type, in particular with regard to whether signals of the camera-based detection unit 3 are detected in multiple colours or a single colour.

A method for the automated driving mode of the vehicle 1 is described hereinbelow, wherein the method focuses on a lidar-based or camera-based detection unit 3, the detection range E of which, also termed field of view or frustum, is directed in front of the vehicle 1 and the detection unit 3 is a so-called long-distance sensor.

Figure 5:
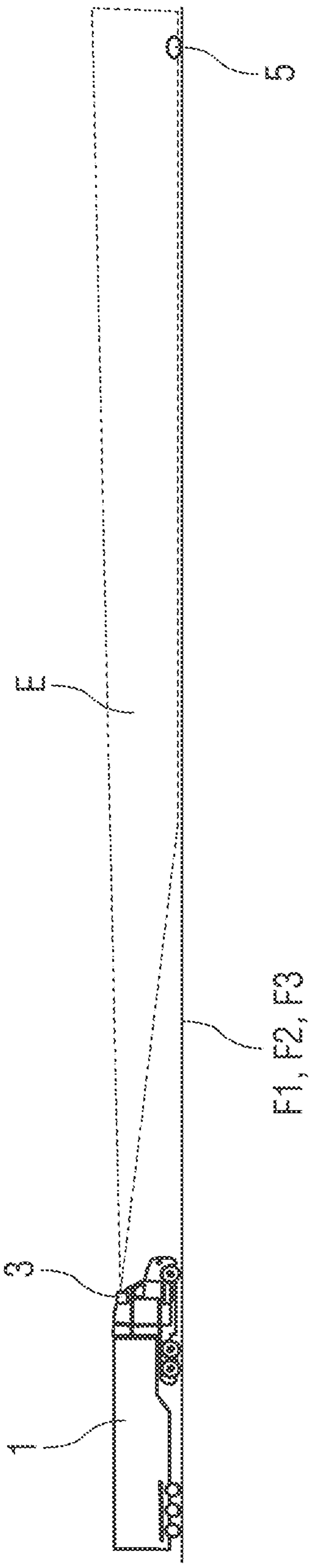
FIG. 5 schematically shows an exemplary vehicle with a detection unit and an object, located in the detection range, which object cannot be driven over by the vehicle.

There is no one driving ahead of the vehicle 1 and there is a high requirement for a visibility of the detection unit 3 and a requirement that a comparatively small object 5 that cannot be driven over and is shown, by way of example, in FIG. 5 is detected in order to be able to react appropriately to it. In order to avoid, as far as possible, the vehicle 1 colliding with the detected object 5, emergency braking is initiated and/or an evasive trajectory is determined, for example.

This detection unit 3 which can see a comparatively long way and is able to detect an object 5 that cannot be driven over is, as described above, a lidar-based sensor or camera sensor with a given aperture angle, wherein the detection unit 3 can also consist of multiple individual sensors.

The objective for an automated driving mode of a vehicle 1, in particular of a truck for transporting goods, is to drive at a maximum possible permissible driving speed in order, for economic reasons, to minimise a period of time during which the vehicle 1 is on the road with its load.

When taking a bend K, a visibility of the detection unit 3 directed in front of the vehicle 1 may be limited by a crash barrier, by structures and/or by plants. Such a situation applies in particular to the inside lane of the bend F2.

In order to be able to react appropriately to an object 5 that potentially cannot be driven over in the respective lane F1 to F3 by braking and/or swerving, it is necessary for the vehicle 1 to reduce its current driving speed, which increases the time period in which the vehicle 1 is in driving mode.

If, as is shown in FIG. 2, the vehicle 1 is driving in the inside lane of the bend F2, then a field of view and thus the detection range E of the detection unit 3 is restricted. If, as is shown in FIG. 1 by contrast, the vehicle 1 is driving in the outside lane of the bend F2, then the visibility is increased.

A first designation K1 depicted in FIGS. 1 and 2 is used to mark a required visibility, which is calculated from a braking distance of the vehicle 1 and is dependent on the maximum inherent deceleration of the vehicle 1 and its current driving speed.

A second designation K2 is used to show an actual visibility S of the detection unit 3, which is considerably less in FIG. 2 than in FIG. 1 if the vehicle 1 is driving in the outside lane of the bend F1. If the vehicle 1 is driving in the outside lane of the bend F1, it finds itself in the detection range E of the detection unit 3, so that the outside lane of the bend F1 is covered by sensors, in particular in relation to an object 5 that cannot be driven over.

The first designation K1, i.e. the required visibility, is located in an area B that is not visible to the detection unit 3, as shown in FIG. 2. The area B that is not visible to the detection unit 3 can also be referred to as the so-called inherent shadow of the bend.

Figure 3:
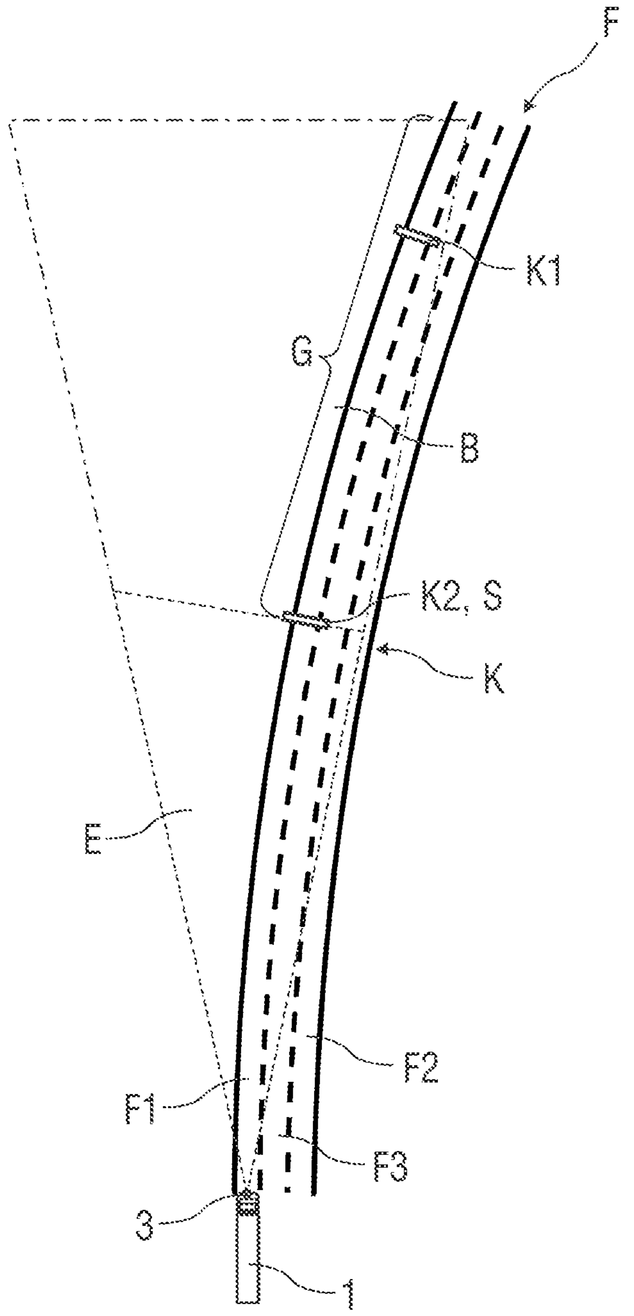
FIG. 3 schematically shows an exemplary situation in which there is a route section with a downhill gradient or incline and a vehicle in an outer lane of a bend.
Figure 4:
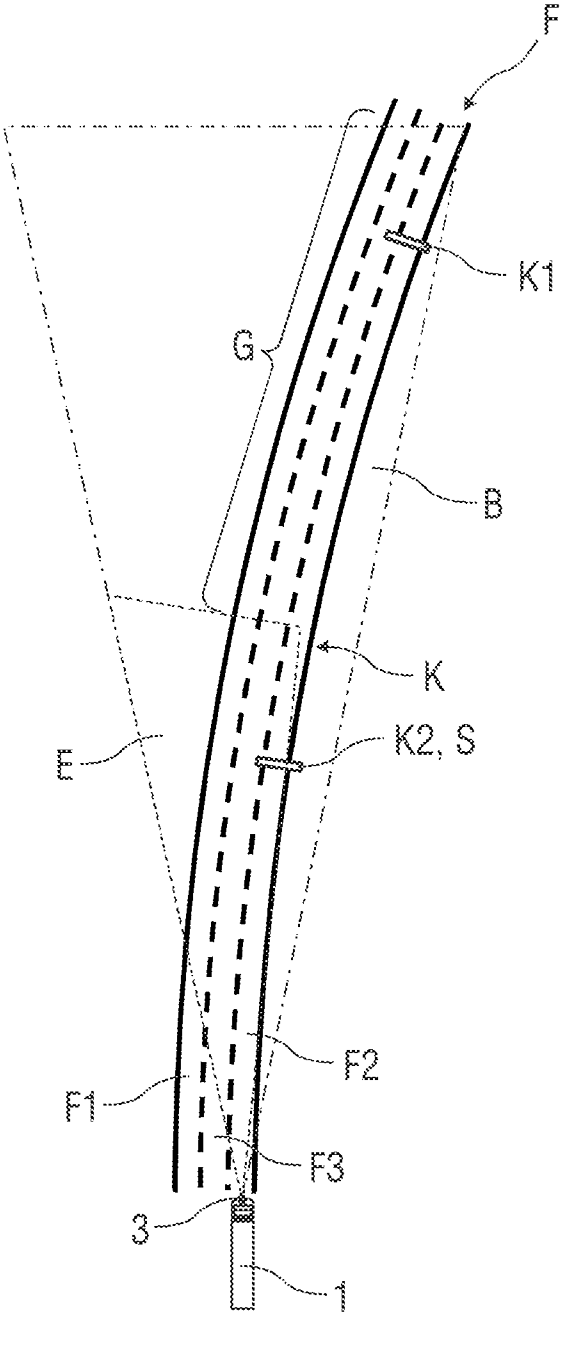
FIG. 4 schematically shows an exemplary situation in which there is a route section with the downhill gradient or incline and a vehicle driving in an inner lane of a bend.

FIGS. 3 and 4 each show a route section F with three lanes F1 to F3 and a bend K, wherein the bend K extends along a downhill gradient or crest, i.e. the route section F has a negative vertical curvature in the region of the bend K. The same applies, however, in the case of road sections having a positive vertical curvature, for example in a dip or on before an incline.

Due to the negative or positive vertical curvature, the surface of the route section F lies in a subsection G beneath or above the detection range E of the detection unit 3. The subsection G of the route section F is thus not visible to the detection unit 3.

In the case of a route section F having a downhill gradient or incline lying ahead, for example beyond a crest or a dip respectively, the actual visibility S, depicted by the second designation, of the detection unit 3 is only changed slightly by changing from the inside lane of the bend F2 to the outside lane of the bend F1, as is shown in FIGS. 3 and 4.

In the case of a route section F having a downhill gradient or incline, a visibility, shown using the first designation K1, required so as to be able to react appropriately to an object 5 that cannot be driven around in the respective lane F1, F2 of the vehicle 1 lies in the area B that is not visible to the detection unit 3. Unlike in FIG. 1, changing lanes to the outside lane of the bend F1 does not increase the actual visibility to the required visibility. The current driving speed of the vehicle 1 must therefore also be adapted after the lane change to the reduction in the actual visibility of the detection unit 3 induced by the bend and the crest or dip. Advantageously, the lane change to the outside lane of the bend F1 is not performed if it is not likely that the actual visibility can be increased to the required visibility by the lane change and if the increase in visibility likely to be achieved by the lane change is small in relation to a desired increase in visibility to the required visibility, in particular smaller than a predefined threshold. This avoids unhelpful lane changes.

If there is a downhill gradient in the route section F, a so-called road self-shadowing needs to be taken into account, whereby to reduce this, the detection unit 3 can be arranged at a comparatively high installation location on the vehicle 1.

In FIGS. 1 to 4, a three-lane route section F is selected without restriction of generality, whereby a hard shoulder is not included for reasons of simplification. In terms of visibility, the hard shoulder can be considered as a separate lane (not shown), so that statements for a two-lane route section F with a hard shoulder in this context are identical to those for the three-lane route section F shown in FIGS. 1 to 4.

FIG. 5 shows a side view of the vehicle 1 with an object 5 that cannot be driven over located in the detection range E of the detection unit 3 on the corresponding lane F1 to F3 of the vehicle 1, which object may be a load that has been lost from a vehicle (not shown) travelling in front.

FIG. 6 shows an enlarged excerpt of the vehicle 1 with the computing unit 2, the detection unit 3 and the position determining unit 4.

By way of example, FIG. 7 shows the computing unit 2 with individual modules.

According to the exemplary embodiment in FIG. 7, the computing unit 2 comprises a speed optimisation module 6, a behaviour planning module 7, a first sensor processing module SV1, a second sensor processing module SV2, a fusion module 8 and the digital map C. The behaviour planning module 7 has a situation analysis and planning module 9 and a trajectory generator 10 which is connected to an actuation system A to control steering, a drivetrain and a brake device.

A first sensor processing module SV1 processes detected signals of other sensors 11, in particular the surroundings sensor system of the vehicle 1, wherein a second sensor processing module SV2 processes detected signals of the detection unit 3.

The processed signals are then fused in a fusion module 8, wherein the speed optimisation module 6 obtains information on a traffic density prevailing on the route section F from the fusion.

A position of the vehicle 1 determined by means of the position determining unit 4 and the digital map C is supplied to the situation analysis and planning module 9.

An algorithm within the speed optimisation module 6 provides that it is determined in a first step S1 using map data from the digital map C whether a crest that cannot be seen is lying ahead of the vehicle 1. It is also determined using the digital map C what lane F1 to F3 the vehicle 1 is in. Decisions to be taken into account by the algorithm are depicted with y for yes and n for no.

If it is determined that there is no crest lying ahead of the vehicle 1, it is determined in a second step S2 whether, at a current driving speed of the vehicle 1, a bend K lying ahead of the vehicle 1 is sufficiently visible on the route section F. It is determined here in particular whether the actual visibility S of the detection unit 3 falls below a predefined threshold value, with the threshold value varying as a function of the current driving speed of the vehicle 1.

If this is not the case, it is determined in a third step S3 how dense the traffic is, wherein if the latter is determined to be not very dense, it is checked in a fourth step S4 whether the vehicle 1 is in the outside lane of the bend F1.

If the vehicle 1 is not in the outside lane of the bend F1, a lane change to the outside lane of the bend F1 is initiated in a fifth step S5.

If it is determined in the first step S1 that there is a crest lying ahead of the vehicle 1 that is not visible, or if it is determined in the third step S3 that the traffic is comparatively dense, or if it is determined in the fourth step S4 of the algorithm that the vehicle 1 is already in the outside lane of the bend F1, then the current driving speed of the vehicle 1 is adapted to the bend-induced or crest-induced visibility restriction in a sixth step S6.

If it is determined in the second step S2 that the next bend K in the route section Fis sufficiently visible in accordance with the current driving speed of the vehicle 1, the driving speed is not adapted, and so the vehicle 1 continues in its automated driving mode at its current driving speed.

If, according to the fifth method step S5, a lane change of the vehicle 1 to the outside lane of the bend F1 is initiated, or if it is necessary to adapt the current driving speed in accordance with the sixth step S6, or if the driving speed does not need to be adapted, information is transmitted to the situation analysis and planning module 9 which forwards this information to the trajectory generator 10 and a trajectory applicable to a current situation is determined and sent the actuation system A.

By applying the method, the automated vehicle 1, in particular a truck for transporting goods, can be operated in a more economically optimised manner, in that comparatively unnecessary braking and re-acceleration cycles of the vehicle 1, which may be induced by cornering, are avoided as far as possible.

An average speed of the vehicle 1 can be optimised, whereby an amount of fuel and/or electrical energy consumed can also be optimised by means of a relatively steady driving mode.

The invention claimed is:

1. A method for autonomously driving a vehicle on a road, wherein the vehicle includes a computing unit electronically coupled to at least one detection unit, wherein the method is executed by the computing unit, the method comprising:
 detecting a bend in the road ahead of the vehicle based on data from the detection unit;
 calculating a visibility metric of the detection unit for the detected bend;
 determining that the visibility metric is below a threshold value and that the visibility metric cannot be increased to above the threshold value by the vehicle remaining in its current lane, but can be increased to above the threshold value by changing lanes to an outside lane of the bend having the same direction of travel as the vehicle; and
 in response to determining that the visibility metric is below the threshold value but can be increased to above the threshold value by changing lanes to the outside lane of the bend:
  generate a trajectory for the vehicle to change lanes to the outside lane of the bend, and
  transmit the trajectory to an actuation system of the vehicle that controls the vehicle in accordance with the trajectory so as to automatically maneuver the vehicle to change lanes to the outside lane of the bend.

2. The method of 1, wherein the threshold value varies as a function of a current driving speed of the vehicle.

3. The method of claim 1, further comprising:
 determining the outside lane from map data and/or image data from a camera of the vehicle.

4. The method of claim 1, wherein the lane change is performed as a function of a traffic density detected ahead of the vehicle.

5. The method of claim 1, wherein a current speed of the vehicle is automatically adjusted based on the visibility of the detection unit.

6. The method of claim 1, wherein a required visibility of the detection unit is determined based on a predicted current braking distance of the vehicle.

7. The method of claim 1, wherein the outside lane is on a left-hand side of the vehicle in the case of a right-hand bend, and wherein the outside lane is on a right-hand side of the vehicle in the case of a left-hand bend.

8. A system for autonomously driving a vehicle on a road, the system comprising:
 a detection unit of the vehicle;
 a computing unit of the vehicle, wherein the computing unit is electronically coupled to the detection unit and is configured to:
  detect a bend in the road ahead of the vehicle based on data from the detection unit,
  calculate a visibility metric of the detection unit for the detected bend,
  determine that the visibility metric is below a threshold value and that the visibility metric cannot be increased to above the threshold value by the vehicle remaining in its current lane, but can be increased to above the threshold value by changing lanes to an outside lane of the bend having the same direction of travel as the vehicle, and
  in response to determining that the visibility metric is below the threshold value but can be increased to above the threshold value by changing lanes to the outside lane of the bend:
   generate a trajectory for the vehicle to change lanes to the outside lane of the bend, and
   transmit the trajectory to an actuation system of the vehicle that controls the vehicle in accordance with the trajectory so as to automatically maneuver the vehicle to change lanes to the outside lane of the bend.

9. An autonomous vehicle, comprising:
 a detection unit;
 a computing unit electronically coupled to the detection unit, wherein the computing unit is configured to:
  detect a bend in a road ahead of the vehicle based on data from the detection unit,
  calculate a visibility metric of the detection unit for the detected bend,
  determine that the visibility metric is below a threshold value and that the visibility metric cannot be increased to above the threshold value by the vehicle remaining in its current lane, but can be increased to above the threshold value by changing lanes to an outside lane of the bend having the same direction of travel as the vehicle, and
  in response to determining that the visibility metric is below the threshold value but can be increased to above the threshold value by changing lanes to the outside lane of the bend:
   generate a trajectory for the vehicle to change lanes to the outside lane of the bend, and
   transmit the trajectory to an actuation system of the vehicle that controls the vehicle in accordance with the trajectory so as to automatically maneuver the vehicle to change lanes to the outside lane of the bend.

* * * * *